3,009,947
PRODUCTION OF CHLORALKYL ESTERS OF ACRYLIC ACID AND ITS SUBSTITUTION PRODUCTS
Hubertus Baron, Ludwigshafen (Rhine), and Herbert Friederich, Worms, Germany, assignors to Badische Anilin- & Soda-Fabrik Aktiengesellschaft, Ludwigshafen (Rhine), Germany
No Drawing. Filed Apr. 1, 1960, Ser. No. 19,189
Claims priority, application Germany Apr. 4, 1959
5 Claims. (Cl. 260—486)

This invention relates to a process for the production of chloralkyl esters by reacting acrylic acid chloride or chlorides of substitution products of acrylic acid with non-aromatic heterocyclic compounds which have at least one oxygen atom as a ring member.

We have found that chloralkyl esters of acrylic acid or its substitution products can be prepared by reacting an acrylic acid chloride which may be substituted in alpha- or beta-position by halogen or a lower alkyl radical, with a non-aromatic compound containing oxygen in the ring and having at least four ring members.

Thus for example by the reaction of acrylic acid chloride with tetrahydrofurane in the presenec of an acid catalyst there is formed acrylic acid (delta-chlor)-normal-butyl ester:

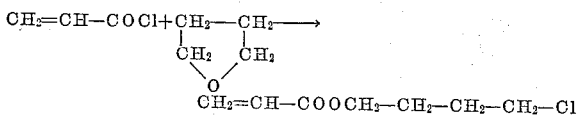

$$CH_2=CH-COOCH_2-CH_2-CH_2-CH_2-Cl$$

As heterocyclic compounds of the said kind there are especially suitable the substituted and unsubstituted 4-, 5- and 6-membered non-aromatic cyclic compounds containing an oxygen atom as a member of the ring, as for example trimethylene oxide, 3,3-dimethyl-trimethylene oxide, 3,3-bis-(chloromethyl)-oxacyclobutane, tetrahydrofurane, tetrahydropyrane, dihydropyrane, or also compounds which, like dioxane, contain two oxygen atoms in the ring.

Besides acrylic acid chloride there may also be reacted with the oxygen-containing heterocyclic compounds, substitution products of acrylic acid chloride, as for example alpha-halogenacrylic acid chlorides, such as alpha-chlor- or alpha-brom-acrylic acid chloride, or alkylacrylic acid chlorides, such as methacrylic acid chloride or crotonic acid chloride or beta-methylcrotonic acid chloride. The corresponding bromides can also be used.

The reaction is carried out in the presence of acid catalysts. Aluminum chloride, tin tetrachloride and also sulfuric acid or concentrated hydrochloric acid are especially suitable. Since hydrochloric acid is formed from the acid chloride in the presence of small amounts of moisture, this will in many cases be sufficient to catalyze the reaction.

Since the reaction proceeds exothermically it is necessary in some cases to cool the reaction vessel at the beginning of the reaction in order to lead away the amount of heat set free. If a substantially complete reaction is to be achieved, it is preferable however to heat the reaction vessel towards the end of the reaction. In general the reaction proceeds to completion in the temperature range between 20° and 150° C. In some cases the reaction is so violent that it is advantageous to add a suitable solvent, for example chloroform or even benzene, and then remove the heat partly by reflux cooling.

The acrylic acid chloride or its substitution products and the oxygen-containing heterocyclic compounds are preferably brought together in stoichiometrical proportions.

The compounds prepared according to this invention may easily be polymerized and also copolymerized with vinyl-aromatic compounds. In order to avoid premature polymerization, it is advantageous not to allow the reaction to proceed to completion but to discontinue it when a 50 to 70% conversion is attained and to distil off the unreacted initial material at atmospheric or reduced pressure; the unreacted initial material can be used again.

The reaction may be carried out especially advantageously in continuous operation. If the reaction is interrupted at a 50 to 70% conversion or high reaction temperatures are avoided, the amount of byproducts of higher boiling point formed is reduced. Thus, for example, in the reaction of tetrahydrofurane with acrylic acid chloride at 100° to 150° C., not only is acrylic acid (delta-chlor)-normal-butyl ester obtained, but also to a considerable extent a higher boiling polymerizable reaction product formed from two molecules of tetrahydrofurane and one molecule of acrylic acid chloride. This is probably acrylic acid (delta-chlor-butoxy)-butyl ester $CH_2=CH-COO-(CH_2)_4-O-(CH_2)_4-Cl$.

The new compounds prepared according to the process of this invention may be used as raw materials for the production of synthetic resins and plastics or as intermediate products for the production of pharmaceutical products, insecticides osr herbicides.

It has heretofore already been known that epichlorhydrin and acetyl chloride can be reacted in the presence of iron (III) chloride as a catalyst to form the diacetate of glycerin chlorhydrin. Ethylene oxide has also already been added on to fatty acids or fatty acid anhydrides with opening of the ring, carboxylic acid beta-hydroxyethyl esters thereby being formed. Tetrahydrofurane has also already been reacted in the presence of tin tetrachloride with acetyl chloride to form acetic acid chlorbutyl ester. The reactions of saturated aliphatic acids cannot however be directly transferred to acrylic acid or, as in the present case, to acrylic acid chloride, because acrylic acid chloride is a very reactive and easily polymerizable compound of which it is already known that it polymerizes for example in the presence of aluminum chloride even at low temperatures. It is therefore surprising that under the reaction conditions of the present invention no polymerization of the acrylic acid chloride takes place and also that no adding on of the acryloyl radical to the double linkage of the acrylic acid chloride takes place.

The following examples will further illustrate this invention but the invention is not restricted to these examples. The parts are by weight.

*Example 1*

432 parts of tetrahydrofurane are added slowly to 543 parts of acrylic acid chloride and 18 parts of aluminum chloride while stirring. Without external heating, the reaction mixture heats up to about 100° C. within an hour. It is stirred for about 6 hours. The mixture thereby cools down again to room temperature. After adding 0.1% of methylene blue (with reference to the amount of product to be distilled) unreacted acrylic acid chloride and tetrahydrofurane are distilled off from the reaction mixture at normal or slightly reduced pressure. By further distillation under reduced pressure, a crude product is obtained at 2 mm. Hg in the boiling range between 143° and 211° C. in a yield of 778 parts. This is fractionally distilled below a short column under reduced pressure, the product to be distilled again being stabilized with 0.1% of methylene blue. 592 parts of acrylic acid (delta-chlor)-normal-butyl ester with a boiling point of 76° to 86° C. at 92 mm. Hg ($n_D^{20}=1.4560$ to 1.4570) and 130 parts of a product with a boiling point of 121° to 125° C. at 0.8 mm. Hg ($n_D^{20}=1.4579$) and the empirical formula $C_{11}H_{19}O_3Cl$ are obtained. The latter product is probably acrylic acid (delta-chlor-normal-butoxy)-normal-butyl ester $$CH_2=CH-COO-(CH_2)_4-O-(CH_2)_4Cl$$

*Example 2*

432 parts of tetrahydrofurane are added slowly while cooling and stirring to a solution of 6 parts of aluminum chloride in 543 parts of acrylic acid chloride. The temperature inside the vessel should not exceed 30° C. The reaction mixture is kept at this temperature for a total period of about 20 hours with continuous stirring.

By distillation as in Example 1 with the addition of methylene blue as a stabilizer, about 220 parts of unreacted acrylic acid chloride and tetrahydrofurane are recovered and 220 parts of acrylic acid delta-chlorbutyl ester are obtained.

*Example 3*

516 parts of 3,3-dimethyl-trimethylene oxide are added in the course of 5 minutes to a solution of 6 parts of aluminum chloride in 543 parts of acrylic acid chloride and the mixture cooled so that the temperature does not exceed 70° C. After stirring the mixture for 10 hours, and after adding a small amount of methylene blue as a stabilizer, it is distilled off from aluminum chloride. In a subsequent fractionation under reduced pressure below a short column, 950 parts of acrylic acid (beta,beta-dimethyl-gamma-chlor)-propyl ester

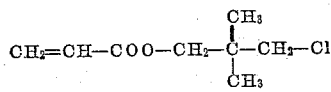

which boils at 78° to 93° C. at 0.2 mm. Hg and has a refractive index of $n_D^{22}=1.4492$, are obtained.

*Example 4*

165 parts of 3,3-bis-(chlormethyl)-oxacyclobutane are added while stirring to 181 parts of acrylic acid chloride and 2.4 parts of aluminum oxide. The mixture is heated to 80° C. and stirred at this temperature for 4 hours; it thereby becomes discolored brown-red. By fractional distillation under reduced pressure there are obtained 143 parts of acrylic acid-2-(tris-chlormethyl)-ethyl ester.

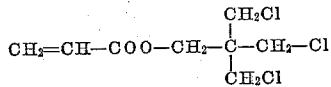

with a boiling point of 127° to 128° C. at 1.5 mm. Hg ($n_D^{16}=1.4777$). A part of the unreacted acrylic acid chloride can be recovered.

The liquid to be distilled and the distillate are stabilized against polymerization with methylene blue. As a further aid to the prevention of the polymerization which readily occurs, nitrogen is led into the distillation column.

*Example 5*

1.8 parts of tin tetrachloride are added in three portions at intervals of 20 minutes to a mixture of 90.5 parts of acrylic acid chloride and 88.1 parts of dioxane while stirring and the mixture is then boiled under reflux for 4 hours at 85° to 90° C. After adding methylene blue as a polymerization inhibitor, the mixture is distilled under reduced pressure. There are thus recovered about 90 parts of a mixture of acrylic acid chloride and dioxane, and 70 parts of acrylic acid (chlorethoxy)-ethyl ester.

$$CH_2=CH-COO-CH_2-CH_2-O-CH_2-CH_2-Cl$$

are obtained with the boiling point 125° to 127° C. at 22 mm. Hg and the refractive index $n_D^{21}=1.4550$.

We claim:

1. A process for the production of chloralkyl esters of acrylic acid and substitution products thereof which comprises causing a compound selected from the group consisting of acrylic acid chloride, methacrylic acid chloride, crotonic acid chloride, alpha-chlor acrylic acid chloride and alpha-brom acrylic acid chloride to react with a non-aromatic heterocyclic compound with at least four ring members in the ring in which at least one ring member is oxygen, said compound being selected from the group consisting of tetrahydrofurane, 3,3-dimethyl-trimethylene oxide, 3,3-bis(chlormethyl)-oxycyclobutane, tetrahydropyrane, dihydropyrane and dioxane at a temperature between 20° and 150° C. in the presence of an acid catalyst.

2. Acrylic acid (delta-chlor-normal-butoxy)-normal butyl ester $$CH_2=CH-COO-(CH_2)_4-O-(CH_2)_4Cl$$

3. Acrylic acid (beta, beta-dimethyl-gamma-chlor)-propyl ester

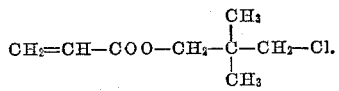

4. Acrylic acid-2-(tris-chlormethyl)-ethyl ester

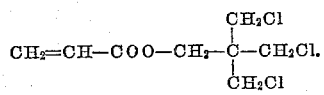

5. A chloralkyl ester of acrylic acid having the formula $$CH_2=CH-COO-R$$

wherein R is selected from the group consisting of

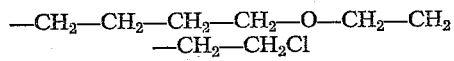
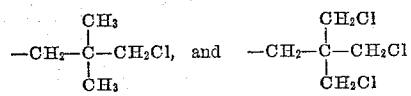

References Cited in the file of this patent

Rehberg et al.: Journal Organic Chemistry, vol. 14, pp. 1094–1098, 1949.